Jan. 24, 1956  F. E. BELLOWS  2,731,863
HAND SUPPORTABLE CLAMP AND BENCH MOUNT THEREFOR
Filed Nov. 19, 1954
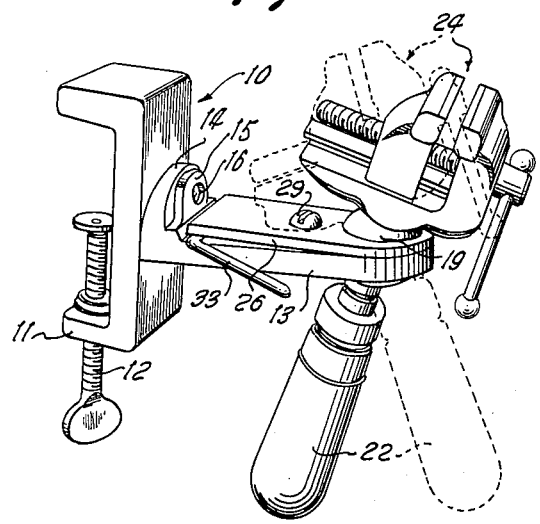
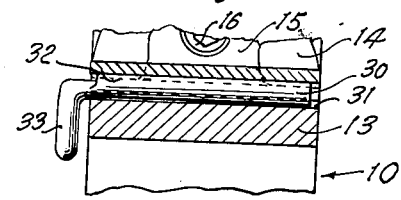
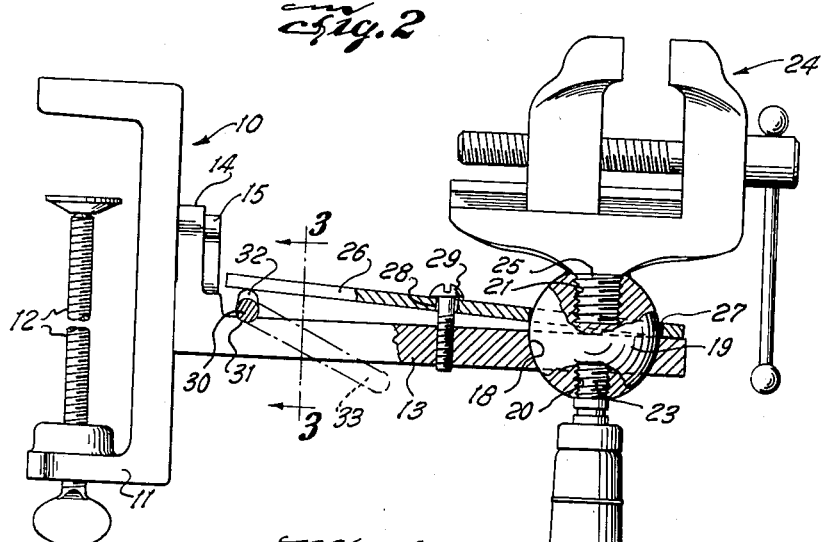
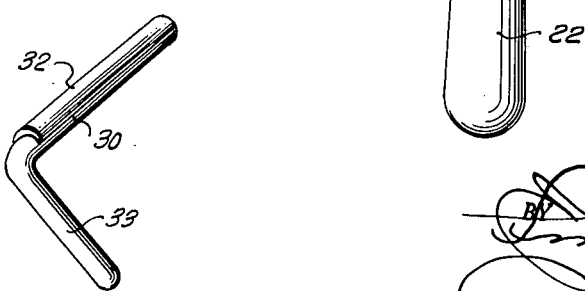
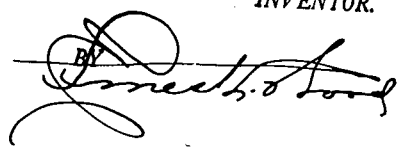
Foy E. Bellows
INVENTOR.
ATTORNEY

United States Patent Office 2,731,863
Patented Jan. 24, 1956

2,731,863
HAND SUPPORTABLE CLAMP AND BENCH MOUNT THEREFOR

Foy E. Bellows, Dallas, Tex.

Application November 19, 1954, Serial No. 470,022

7 Claims. (Cl. 81—41)

This invention relates to work-holding clamps and more particularly to a hand supportable clamp and bench mount therefor.

The principal object of the invention is to provide a utility clamp having a high degree of flexibility in the sense that the clamp-holding medium, that is, a spheroidal element, is universally movable by means of a depending handle in relation to the clamp mounting and which latter is rotatable on a horizontal axis with respect to a work bench and securable in a variety of adjusted positions for convenient access to work held in the clamp. Moreover, the handle is removable from the clamp holding element as is likewise the clamp itself for interchangeability with clamps designed for various types and kinds of work.

Another object of the invention is to provide a clamp mounting consisting of an extension, one end of which is pivoted to a bench clamp for rotation about a horizontal axis while the opposite end of the extension has a beveled opening defining a socket for a ball. A ball-clamping plate, apertured to receive the ball is movably disposed on the extension and actuated by eccentric means to frictionally engage and hold the ball in adjusted position, the ball being the medium to which is removably attached a work clamp and manipulating handle.

Other objects will appear as the description proceeds, taken in connection with the annexed drawing, wherein:

Figure 1 is a perspective view of a work-holding clamp and bench mounting constructed according to the invention.

Figure 2 is a side elevation with portions broken away and shown in section.

Figure 3 is a fragmental sectional view taken on line 3—3 of Figure 2, and

Figure 4 is a detail perspective view of the ball clamping plate actuating means.

Continuing with a more detailed description of the drawing, reference numeral 10 denotes a C-clamp, through one leg 11 of which is threaded a screw 12, by which the clamp is secured to a ledge of a work bench.

An extension 13 is disposed perpendicular to the bench clamp 10 and has an upturned leg 14 which bears flush against the face of clamp 10. A reinforcing boss 15 is formed on the leg 14 and a hole is bored through the boss 15 and leg 14 to receive a screw 16 by which the extension is secured to the clamp 10 and rotatable about the horizontal axis afforded by the screw 16. A wrench-receiving socket is provided in the end of the screw 16 (see Figure 3) for ready angular adjustment of the extension 13.

The extension 13 has a hole 18 therein near the end opposite its point of securement with the clamp 10, which hole is defined by concave walls corresponding to the contour of a ball 19, thus defining a spherical seat or socket for this ball. The ball extends above and below the extension plate 13 and has diametrically opposed and threaded bores 20 and 21 therein.

A manipulating handle 22 has a threaded pin 23 which is receivable in the bore 20 of the ball 19 and by means of this handle, the ball is movable in its socket, thus to dispose the work holder, secured to the ball, in any number of positions.

The work holder referred to in the foregoing may consist of the conventional vise 24 or such a device as described in my Letters Patent No. 2,660,079, dated November 24, 1953, designed to clamp finger rings or other similar articles while work is being performed thereon. In any case, the work holder 24 is also provided with an integral threaded pin 25, receivable in the opening 21 of the ball 19 for ready interchangeability.

To secure the ball 19, and consequently the work holder 24, in adjusted positions, a friction plate 26 is disposed on and is coextensive with the length and breadth of the flat top surface of the extension 13. This plate has an opening 27 adjacent one end adapted to register with opening 18 in the extension and has straight sides for engagement with the ball 19 which it receives. A smaller opening 28 is made in the approximate midsection of the plate 26 to receive a retaining screw 29 but is of such size as to permit a limited degree of movement of the plate on the screw.

The purpose in allowing for displacement of the clamping plate 26 in relation to the extension 13 and ball 19 is to bring the edge of opening 27 nearest the outer end of plate 26 into frictional engagement with the outer surface of the ball 19 by longitudinal displacement of the plate away from the bench clamp 10, while the plate is held down, within limits, by the screw 29. Longitudinal displacement of the plate 26 is accomplished by means of a transverse rod 30, lying in a groove 31 in the top surface of extension 13. This rod is disposed under the free end of plate 26 opposite the ball-receiving hole 27 and has an elongated boss or built-up portion 32 forming an eccentric which cammingly engages the underside of the plate 26 to raise and lower the same when the handle 33, formed by bending the rod 30 at right angles, is oscillated.

To clamp the ball 19 against movement, the handle 33 is raised toward the dotted position shown in Figure 2. This action causes a slight endwise movement of the clamping plate 26, and forces the edge of the opening 27 in the end of the plate down against the ball with sufficient frictional force to hold the ball in any adjusted position.

The work holder or ball manipulating handle 22 may be dispensed with, if desired, while employing the vise 24 but it is especially useful in manipulating a holder for engraver's, jeweler's or watchmaker's work which requires constant movement for the best results.

Manifestly, the construction as shown and described is capable of some modification and such modification as may be construed to fall within the scope and meaning of the appended claims is also considered to be within the scope of the invention.

What is claimed is:

1. A hand supportable clamp and bench mount therefor comprising a support, an extension perpendicular to said support and having a spherical seat adjacent one end and secured at its opposite end to said support for rotation about an axis parallel with the longitudinal axis of said extension, a ball oscillatably retained in said beveled opening and having diametrically opposed and threaded openings therein, a handle having a pin receivable in one of said openings, a work-holding clamp having a pin threaded into the other of said openings, a clamping plate substantially coextensive with the upper surface of said extension and having an opening at one end embracing said ball and means operative to elevate said plate at its opposite end to cause frictional engagement between said ball and the edges of said ball-embracing opening to hold said ball against displacement from adjusted positions.

2. A hand supportable clamp and bench mount therefor comprising a support, an extension perpendicular to said support and secured thereto at one end for rotation about an axis parallel with the longitudinal axis of said extension, a ball oscillatable in a socket opening formed in the opposite end of said extension, a handle removably attached to said ball, a work-holding clamp removably attached to said ball diametrically opposite said handle, a clamping plate overlying said extension and loosely attached thereto, said plate having an opening at one end receiving said ball and means for elevating said plate at its opposite end to effect frictional holding engagement between said ball and the edges of the ball-receiving opening of said plate.

3. A hand supportable clamp and bench mount therefor comprising a support, an extension secured at one end to said support for rotation about an axis parallel with the longitudinal axis of said extension, said extension having a spherical seat formed in its opposite end, a ball oscillatable in said seat, a work-holding clamp detachably secured to said ball above said extension, a handle detachably secured to said ball and depending therefrom below said extension, a clamping plate mounted on said extension and frictionally engaging said ball at one end and means for raising and lowering the opposite end of said clamping plate to move the same into and out of frictional engagement with said ball.

4. A hand supportable clamp and bench mount therefor comprising a support, an elongated extension joined at one end to said support for rotation about an offset axis parallel to the longitudinal axis of said extension, a ball oscillatably disposed in an opening through said extension adjacent its opposite end, said opening defining a spherical seat for said ball, a work-holding clamp detachably mounted on said ball above said extension, a clamping plate frictionally engageable with said ball at one end, means at the opposite end of said clamping plate for moving the same to effect frictional engagement and disengagement with said plate with respect to said ball and means for manipulating said ball in its seat.

5. The structure of claim 4 in which the plate-moving means consists of an eccentric rod oscillatably disposed transversely between said plate and said extension and means for actuating said rod.

6. The structure of claim 4 in which said clamping plate has an opening in one end receiving said ball, one edge of which is brought into frictional engagement with said ball when the opposite end of said plate is elevated.

7. The structure of claim 4, and a screw extending upwardly from said extension and loosely disposed in an aperture in the midsection of said clamping plate to hold the same within predetermined displacement limits with respect to said extension.

References Cited in the file of this patent
UNITED STATES PATENTS

| | | |
|---|---|---|
| D. 135,081 | Breuner | Feb. 23, 1943 |
| 2,352,699 | Ennis | July 4, 1944 |
| 2,660,079 | Bellows | Nov. 24, 1953 |